United States Patent [19]

Yokoyama et al.

[11] Patent Number: 5,556,929

[45] Date of Patent: Sep. 17, 1996

[54] OCULAR LENS MATERIAL

[75] Inventors: Yasuhiro Yokoyama; Yuriko Watanabe; Akinori Okumura, all of Nagoya; Shoji Ichinohe; Toshio Yamazaki, both of Gunma-ken, all of Japan

[73] Assignees: Menicon Co., Ltd., Nagoya; Shin-Etsu Chemical Co., Ltd., Tokyo, both of Japan

[21] Appl. No.: 582,023

[22] Filed: Jan. 2, 1996

Related U.S. Application Data

[63] Continuation of Ser. No. 302,404, Sep. 8, 1994, abandoned.

[30] Foreign Application Priority Data

Sep. 27, 1993 [JP] Japan .................................. 5-239967

[51] Int. Cl.$^6$ ...................................................... C08F 26/00
[52] U.S. Cl. ........................... 526/248; 526/279; 523/107
[58] Field of Search ..................... 526/248, 279; 523/107, 106

[56] References Cited

U.S. PATENT DOCUMENTS

| | | | |
|---|---|---|---|
| 4,954,586 | 9/1990 | Toyoshima et al. | 526/279 |
| 5,177,165 | 1/1993 | Valint, Jr. et al. | 526/279 |
| 5,274,008 | 12/1993 | Lai | 526/279 |

FOREIGN PATENT DOCUMENTS

| | | | |
|---|---|---|---|
| WO91/0155 | 7/1991 | WIPO | 526/279 |

*Primary Examiner*—Mark D. Sweet
*Attorney, Agent, or Firm*—Oblon, Spivak, McClelland, Maier, & Neustadt, P.C.

[57] ABSTRACT

An ocular lens material made of a copolymer obtained by polymerizing copolymerizable components comprising (A) a fluorine-containing di(meth)acrylate having urethane bonds, of the formula (I):

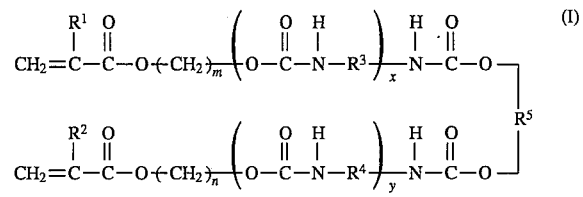

wherein each of $R^1$ and $R^2$ independently represents a hydrogen atom or a methyl group, each of $R^3$ and $R^4$ independently represents a $C_{5-15}$ alkylene group, $R^5$ represents a $C_{1-20}$ alkylene group containing from 1 to 20 fluorine atoms, each of m and n independently represents an integer of from 1 to 5, and each of x and y independently represents 0 or 1, (B) a silicone-containing di(meth)acrylate having urethane bonds, of the formula (II):

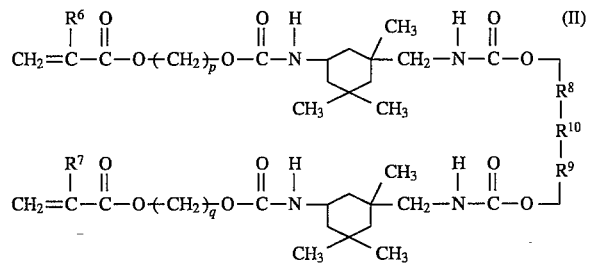

wherein each of $R^6$ and $R^7$ independently represents a hydrogen atom or a methyl group, each of $R^8$ and $R^9$ independently represents a $C_{1-10}$ alkylene group or a $C_{2-10}$ ether group, $R^{10}$ represents a siloxane structure of the formula (III):

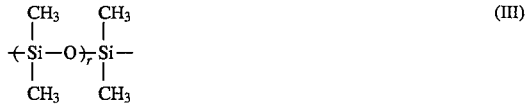

wherein r is an integer of from 1 to 50, and each of p and q independently represents an integer of from 1 to 5, and (C) a monomer having an unsaturated double bond, copolymerizable with the fluorine-containing di(meth)acrylate (A) and the silicone-containing di(meth)acrylate (B).

3 Claims, No Drawings

OCULAR LENS MATERIAL

This application is a Continuation of application Ser. No. 08/302,404, filed on Sep. 8, 1994, now abandoned.

BACKGROUND OF THE INVENTION

1. Field of the Invention

The present invention relates to an ocular lens material. More particularly, it relates to an ocular lens material which has high oxygen permeability and high mechanical strength and is excellent also in deposit resistance and which is thus useful for e.g. contact lenses, intraocular lenses or artificial cornea.

1. Discussion of Background

Heretofore, as ocular lens materials, particularly as materials for hard contact lenses, those made of copolymers of e.g. siloxanyl methacrylate or fluoroalkyl methacrylate, which are excellent in oxygen permeability, have been widely used. However, when these materials are formed into contact lenses, the mechanical strength tends to deteriorate, and such contact lenses are likely to break when washed by the users.

The contact lenses include soft contact lenses other than the above-mentioned hard contact lenses. The soft contact lenses have merits such that they are soft and flexible and thus readily compatible with cornea, and thus they present comfortable feeling to wearers. Such soft contact lenses include substantially non-water absorptive contact lenses. However, most of usual soft-contact lenses are water-absorptive contact lenses which soften upon absorption of water. Such water-absorptive soft contact lenses are not so excellent in oxygen permeability and may sometimes hinder metabolism of cornea. Therefore, in recent years, there have been attempts to increase the water content of such soft contact lenses and thereby to improve the oxygen permeability. However, there is a problem that as the water content increases, the mechanical strength tends to decrease, and bacteria or the like tend to propagate readily in the material.

As materials to solve the above problem, there have been proposed a contact lens material made of a polymer obtained by polymerizing polymerizable components containing a bifunctional organosiloxane macromer as the main component (Japanese Unexamined Patent Publication No. 5861/1993), a fluorine-containing soft contact lens material obtained by copolymerizing a hydrophilic monomer, a methacrylic acid derivative and a fluorine-containing urethane dimethacrylate ester (Japanese Unexamined Patent Publication No. 130109/1992) and a contact lens material made of a copolymer obtained from a monomer mixture containing a siloxane oligomer as an essential component (pamphlet of International Publication No. 91/10155).

It is true that these materials are relatively superior to conventional materials in the oxygen permeability and mechanical strength such as impact resistance, and the above-mentioned fluorine-containing soft contact lens material has deposit resistance to some extent. However, such physical properties are still not practically fully satisfactory, and it is desired to develop an ocular lens material which has superior oxygen permeability and high mechanical strength and which at the same time is excellent in deposit resistance.

SUMMARY OF THE INVENTION

Under these circumstances, the present inventors have conducted extensive research to obtain an ocular lens material which has high oxygen permeability and high mechanical strength and which at the same time is excellent in deposit resistance and, as a result, have found it possible to obtain an ocular lens material capable of satisfying all of such physical properties simultaneously by using a copolymer obtainable by polymerizing copolymerizable components comprising a certain specific fluorine-containing di(meth)acrylate having urethane bonds, and a certain specific silicone-containing di(meth)acrylate having urethane bonds. The present invention has been accomplished on the basis of this discovery.

Thus, the present invention provides an ocular lens material made of a copolymer obtained by polymerizing copolymerizable components comprising (A) a fluorine-containing di(meth)acrylate having urethane bonds, of the formula (I):

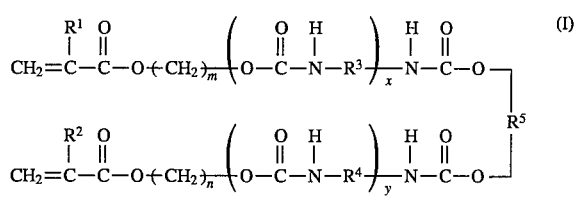

wherein each of $R^1$ and $R^2$ independently represents a hydrogen atom or a methyl group, each of $R^3$ and $R^4$ independently represents a $C_{5-15}$ alkylene group, $R^5$ represents a $C_{1-20}$ alkylene group containing from 1 to 20 fluorine atoms, each of m and n independently represents an integer of from 1 to 5, and each of x and y independently represents 0 or 1, (B) a silicone-containing di(meth)acrylate having urethane bonds, of the formula (II):

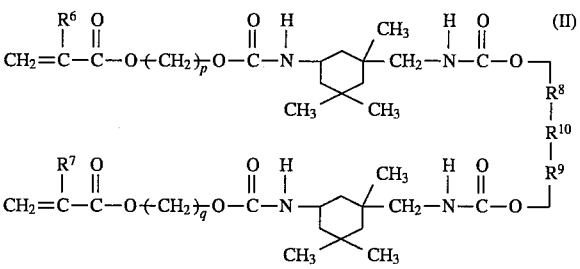

wherein each of $R^6$ and $R^7$ independently represents a hydrogen atom or a methyl group, each of $R^8$ and $R^9$ independently represents a $C_{1-10}$ alkylene group or a $C_{2-10}$ ether group, $R^{10}$ represents a siloxane structure of the formula (III):

wherein r is an integer of from 1 to 50, and each of p and q independently represents an integer of from 1 to 5, and (C) a monomer having an unsaturated double bond, copolymerizable with the fluorine-containing di(meth)acrylate (A) and the silicone-containing di(meth)acrylate (B).

DETAILED DESCRIPTION OF THE PREFERRED EMBODIMENTS

As described above, the ocular lens material of the present invention is made of a copolymer obtained by polymerizing copolymerizable components comprising (A) a fluorine-containing di(meth)acrylate having urethane bonds, of the formula (I), (B) a silicone-containing di(meth)acrylate having urethane bonds, of the formula (II) and (C) a monomer having an unsaturated double bond copolymerizable with the fluorine-containing di(meth)acrylate (A) and the silicone-containing di(meth)acrylate (B).

In the present invention, the copolymerizable components are used which simultaneously contain (A) a fluorine-containing di(meth)acrylate having urethane bonds, of the formula (I), which is capable of imparting excellent deposit resistance and high mechanical strength (hereinafter referred to as the di(meth)acrylate (A)), (B) a silicone-containing di(meth)acrylate having urethane bonds, of the formula (II), which is capable of imparting excellent oxygen permeability and high mechanical strength (hereinafter referred to as the di(meth)acrylate (B)), and (C) a monomer having an unsaturated double bond copolymerizable with the di(meth)acrylate (A) and the di(meth)acrylate (B), which is capable of imparting a desired property depending upon the particular purpose, such as flexibility, hydrophilic nature or a desired water content (hereinafter referred to as other monomer (C)). Accordingly, it is possible to obtain an ocular lens material which has high oxygen permeability and high mechanical strength and at the same time exhibits such excellent deposit resistance that has not been observed with conventional materials, and which has a desired property imparted.

In this specification, the term "(meth)acrylate" means "acrylate and/or methacrylate".

In the formula (I) for the di(meth)acrylate (A), each of $R^1$ and $R^2$ independently represents a hydrogen atom or a methyl group, and each of $R^3$ and $R^4$ independently represents an alkylene group having from 5 to 15 carbon atoms. If the carbon number of such an alkylene group is less than 5, the crosslinking density tends to be high, and the di(meth)acrylate (A) itself tends to be hardened. On the other hand, if it exceeds 15, the di(meth)acrylate (A) tends to soften in a xerogel state, and its compatibility with other copolymerizable components tends to deteriorate substantially. The carbon number of such an alkylene group is preferably from 5 to 10.

In the formula (I), $R^5$ is an alkylene group having from 1 to 20 carbon atoms containing from 1 to 20 fluorine atoms. If the carbon number of such an alkylene group exceeds 20, the di(meth)acrylate (A) tends to soften in a xerogel state, and its compatibility with other copolymerizable components tends to deteriorate substantially. If the number of fluorine atoms contained in such an alkylene group exceeds 20, the compatibility of the di(meth)acrylate (A) with other copolymerizable components tends to deteriorate substantially. The carbon number of such an alkylene group is preferably from 4 to 10, and the number of fluorine atoms contained therein, is preferably from 4 to 10.

In the formula (I), each of m and n independently represents an integer of from 1 to 5. If m or n is larger than 5, the compatibility with other copolymerizable components tends to deteriorate substantially. Each of x and y independently is 0 or 1. However, each of x and y is preferably 1, since it is thereby possible to increase the water content of the resulting ocular lens material without substantially reducing the mechanical strength, and the compatibility with other copolymerizable components is thereby good.

The di(meth)acrylate (A) is incorporated preferably in an amount of from 5 to 30% by weight, more preferably from 10 to 20% by weight, based on the total amount of the copolymerizable components. If the amount of the di(meth)acrylate (A) is less than 5% by weight, no adequate deposit resistance tends to be imparted to the resulting ocular lens material. On the other hand, if it exceeds 30% by weight, the compatibility with the di(meth)acrylate (B) tends to deteriorate, whereby when the ocular lens material is shaped into a lens, the optical properties of the lens tend to deteriorate.

In the formula (II) for the di(meth)acrylate (B), each of $R^6$ and $R^7$ independently represents a hydrogen atom or a methyl group, and each of $R^8$ and $R^9$ independently represents an alkylene group having from 1 to 10 carbon atoms and an ether group having from 2 to 10 carbon atoms. If the carbon number of such an alkylene group or the carbon number of such an ether group exceeds 10, the compatibility with other copolymerizable components tends to deteriorate substantially. The carbon number of such an alkylene group is preferably from 2 to 6, and the carbon number of the ether group is preferably from 2 to 6.

In the formula (II), $R^{10}$ is a siloxane structure of the formula (III). In the formula (III), r is an integer of from 1 to 50. If r exceeds 50, the compatibility of the di(meth)acrylate (B) with the above-mentioned di(meth)acrylate (A) tends to deteriorate. Preferably, r is an integer of from 1 to 30. More preferably, it is an integer of from 1 to 15.

In the formula (II), each of p and q independently represents an integer of from 1 to 5. If p or q exceeds 5, the di(meth)acrylate (B) tends to soften in a xerogel state, and the compatibility with other copolymerizable components tends to deteriorate.

The di(meth)acrylate (B) is incorporated preferably in an amount of from 5 to 50% by weight, more preferably from 10 to 40% by weight, based on the total amount of copolymerizable components. If the amount of the di(meth)acrylate (B) is less than 5% by weight, no adequate oxygen permeability tends to be imparted to the resulting ocular lens material. On the other hand, if it exceeds 50% by weight, the compatibility with the di(meth)acrylate (A) tends to deteriorate, whereby when the ocular lens material is shaped into a lens, the optical property of the lens tends to deteriorate, For the ocular lens material of the present invention, other monomer (C) is further used as a copolymerizable component, which imparts an oxygen permeability or deposit resistance, which imparts hardness or softness, which imparts flexibility or hydrophilic nature, or a desired water content, which undergoes crosslinking to impart improved mechanical strength and durability, which imparts an ultraviolet absorbing property, or which imparts a color. Such other monomer is incorporated so that it constitutes the rest after excluding the amounts of the di(meth)acrylate (A) and the di(meth)acrylate (B) from the total amount of the copolymerizable components.

For example, in order to adjust the water content of the resulting ocular lens material or to impart flexibility or hydrophilic nature to the material, one or more monomers may be selected for use from, for example, (meth)acrylamides such as N,N-dimethyl (meth)acrylamide, N,N-diethyl (meth)acrylamide, N,N-dimethylaminopropyl (meth)acrylamide and N,N-diisopropyl (meth)acrylamide; N-vinyl lactams such as N-vinylpyrrolidone, α-methylene-N-vinylpyrrolidone, N-vinylpiperidine and N-vinylcaprolactam; hydroxyalkyl (meth)acrylates such as 2-hydroxyethyl (meth)acrylate, hydroxybutyl (meth)acrylate and hydroxypropyl (meth)acrylate; (alkyl)aminoalkyl (meth)acrylates such as 2-dimethylaminoethyl (meth)acrylate and 2-butylaminoethyl (meth)acrylate; polyglycol mono(meth)acrylates such as propylene glycol mono(meth)acrylate; (meth)acrylic acids; maleic anhydride; maleic acid; fumaric acid; fumaric acid derivatives; aminostyrene; and hydroxystyrene.

In order to impart a desired water content to the resulting ocular lens material, it is preferred to employ at least one monomer selected from the group consisting of (meth)acrylamides and N-vinyl lactams among said other monomers (C). The amount of such a monomer is preferably from 40 to 80% by weight, based on the total amount of copolymerizable components, in a case where it is intended to obtain a material useful for e.g. a water-absorptive soft contact lens. Further, in order to impart hardness or softness, or flexibility, to the ocular lens material, by adjusting the degree of hardness, one or more members may be selected for use among linear, branched or cyclic alkyl (meth)acrylates, alkoxyalkyl (meth)acrylates and alkylthioalkyl (meth)acrylates, such as methyl (meth)acrylate, ethyl (meth)acrylate, isopropyl (meth)acrylate, n-propyl (meth)acrylate, isobutyl (meth)acrylate, n-butyl (meth)acrylate, 2-ethylhexyl (meth)acrylate, n-octyl (meth)acrylate, n-decyl (meth)acrylate, n-dodecyl (meth)acrylate, tert-butyl (meth)acrylate, pentyl (meth) acrylate, tert-pentyl (meth)acrylate, hexyl (meth) acrylate, heptyl (meth)acrylate, nonyl (meth)acrylate, stearyl (meth)acrylate, cyclopentyl (meth)acrylate, cyclohexyl (meth)acrylate, 2-ethoxyethyl (meth)acrylate, 3-ethoxypropyl (meth)acrylate, 2-methoxyethyl (meth)acrylate, 3-methoxypropyl (meth)acrylate, ethylthioethyl (meth)acrylate and methylthioethyl (meth)acrylate; styrene; and styrene derivatives such as α-methylstyrene, methylstyrene, ethylstyrene, propylstyrene, butylstyrene, t-butylstyrene, isobutylstyrene, benzylstyrene, methyl-α-methylstyrene, ethyl-α-methylstyrene, propyl-α-methylstyrene, butyl-α-methylstyrene, t-butyl-α-methylstyrene, isobutyl-α-methylstyrene and pentyl-α-methylsytrene.

Further, in order to supplementy impart further oxygen permeability to the resulting ocular lens material and to improve the mechanical strength, one or more members may be selected for use among organopolysiloxane-containing alkyl(meth)acrylates such as pentamethyldisiloxanylmethyl (meth)acrylate, trimethylsiloxydimethylsilylpropyl (meth) acrylate, methylbis(trimethylsiloxy)silylpropyl (meth)acrylate, tris(trimethylsiloxy)silylpropyl (meth)acrylate, mono [methylbis(trimethylsiloxy)siloxy] bis(trimethylsiloxy)silylpropyl (meth)acrylate, tris [methylbis(trimethylsiloxy)siloxy]silylpropyl (meth)acrylate, methyl[bis(trimethylsiloxy)]silylpropylglyceryl (meth)acrylate, tris(trimethylsiloxy)silylpropylglyceryl (meth)acrylate, mono[methylbis(trimethylsiloxy)siloxy]bis(trimethylsiloxy)silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy)silylethyltetramethyldisiloxanylmethyl (meth)acrylate, tetramethyltriisopropylcyclotetrasiloxanylpropyl (meth)acrylate, tetramethyltriisopropylcyclotetrasiloxybis(trimethylsiloxy)silylpropyl (meth)acrylate and trimethylsiloxydimethylsilylpropyl (meth)acrylate; alkylvinyl silanes such as trimethylvinyl silane; and organopolysiloxane-containing styrene derivatives of the formula (IV):

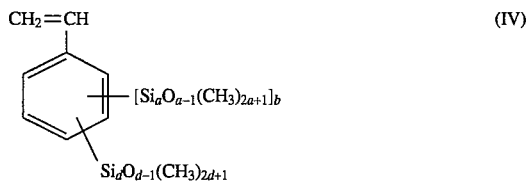

(IV)

wherein a is an integer of from 1 to 15, b is 0 or 1, and d is an integer of from 1 to 15. With respect to the organopolysiloxane-containing styrene derivatives of the formula (IV), if a or d is an integer of at least 16, their purification or synthesis tends to be difficult, and the hardness of the resulting ocular lens material tends to be low. On the other hand, if b is an integer of 2 or more, the synthesis of such organopolysiloxane-containing styrene derivatives tends to be difficult.

Typical examples of the compounds of the formula (IV) include tris(trimethylsiloxy)silylstyrene, bis(trimethylsiloxy)methylsilylstyrene, (trimethylsiloxy)dimethylsilylstyrene, trimethylsilylstyrene, tris(trimethylsiloxy)siloxanyldimethylsilylstyrene, [bis(trimethylsiloxy)methylsiloxanyl]dimethylsilylstyrene, pentamethyldisiloxanylstyrene, pentamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris(pentamethyldisiloxy)silylstyrene, (tristrimethylsiloxy)siloxanylbis(trimethylsiloxy)silylstyrene, bis(heptamethyltrisiloxy)methylsilylstyrene, tris(methylbistrimethylsiloxysiloxy)silylstyrene, trimethylsiloxybis(tristrimethylsiloxysiloxy)silylstyrene, heptakis(trimethylsiloxy)trisiloxanylstyrene, nonamethyltetrasiloxyundecylmethylpentasiloxymethylsilylstyrene, tris(tristrimethylsiloxysiloxy)silylstyrene, (tristrimethylsiloxyhexamethyl)tetrasiloxy(tristrimethylsiloxy) siloxytrimethylsiloxysilylstyrene, nonakis(trimethylsiloxy)tetrasiloxanylstyrene, bis(tridecamethylhexasiloxy)methylsilylstyrene, heptamethylcyclotetrasiloxanylstyrene, heptamethylcyclotetrasiloxybis(trimethylsiloxy)silylstyrene and tripropyltetramethylcyclotetrasiloxanylstyrene.

Further, in order to impart deposit resistance to the resulting ocular lens material, one or more fluorine-containing monomers may be selected for use among fluoroalkyl (meth)acrylates of the formula (V):

$$CH_2=CR^{11}COOC_sH_{(2s-t-u+1)}F_t(OH)_u \qquad (V)$$

wherein $R^{11}$ is a hydrogen atom or a methyl group, s is an integer of from 1 to 15, t is an integer of from 1 to (2s+1), and u is an integer of from 0 to 2; and fluoroalkylstyrene derivatives.

Specific examples of the fluoroalkyl (meth)acrylates of the above formula (V) include 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4hexafluorobutyl (meth)acrylate, 2,2,3,4,4,4-hexafluoro-t-hexyl (meth) acrylate, 2,3,4,5,5,5-hexafluoro-2,4bis(trifluoromethyl)pentyl (meth)acrylate, 2,2,3,3,4,4-hexafluorobutyl (meth) acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoropeptyl (meth)acrylate, 3,3,4,4,5,5,6,6,7,7,8,8-dodecafluoroctyl (meth)acrylate, 3,3,4,4,5,5,6,6,7,7,8,8,8-tridecafluoroctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (mcth)acrylate, 2-hydroxy-4,4,5,5,6,6,7,7,8,9,9,9-dodecafluoro- 6-trifluoromethylnonyl (meth)acrylate, and 2-hydroxy-4,4,5,5,6,6,7,7,8,8,9,9,10,11,11,11-hexadecafluoro- 10-trifluoromethylundecyl (meth)acrylate.

Further, the fluoroalkylstyrene derivatives include, for example, o-trifluoromethylstyrene, m-trifluoromethylstyrene, p-trifluoromethylstyrene, p-perfluoroisopropylstyrene, m,m-bis(trifluoromethyl)styrene, 2,4-bis(trifluoromethyl)styrene, 2,5-bis(trifluoromethyl)styrene, and a fluoroalkylstyrene of the formula (VI):

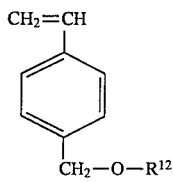

(VI)

wherein $R^{12}$ is a fluorine-substituted alkyl group. Specific examples of the fluoroalkylstyrene of the formula (IV) include trifluoromethylmethoxymethylstyrene, heptafluoropropylmethoxymethylstyrene, trifluoroethoxymethylstyrene, tridecahexylethoxymethylstyrene, 1,4-bistrifluoromethyl-3-oxapentafluorobutylethoxymethylstyrene and 1,4,7-tristrifluoromethyl- 3,6-dioxaheptylmethoxymethylstyrene.

Further, in order to impart mechanical strength and durability to the resulting ocular lens material, one or more crosslinking agents may be selected for use as other monomer (C) among (meth)acrylic acid derivatives such as ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, (meth)acryloyloxydiethyl (meth)acrylate, 4-vinylbenzyl (meth)acrylate, 3-vinylbenzyl (meth)acrylate, 3,3,4,4,5,5,6,6-octafluoro-1,8-octanediol di(meth)acrylate, 2,2,3,3,4-hexafluoro-1,5-pentanediol di(meth)acrylate, 2,2,3,3,4,4,5,5-octafluoro-1,6hexanediol di(meth)acrylate, 3,3,4,4,5,5,6,6-octafluoro-1,8-octanediol di(α-fluoro)(meth)acrylate, 3,3,4,4,5,5,6,6,7,7-decafluoro-1,9-nonanediol di(meth)acrylate, 2,2-bis(p(meth)acryloyloxyphenyl)hexafluoropropane, 2,2-bis(m(meth)acryloyloxyphenyl)hexafluoropropane, 2,2-bis(o(meth)acryloyloxyphenyl)hexafluoropropane, 2,2-bis(p(meth)acryloyloxyphenyl)propane, 2,2-bis(m-(meth)acryloyloxyphenyl)propane, 2,2-bis(o(meth)acryloyloxyphenyl)propane, 1,4-bis(2-(meth)acryloyloxyhexafluoroisopropyl)benzene, 1,3-bis(2-(meth)acryloyloxyhexafluoroisopropyl)benzene, 1,2-bis(2-(meth)acryloyloxyhexafluoroisopropyl)benzene, 1,4-bis(2-meth)acryloyloxyisopropyl)benzene, 1,3-bis(2-meth)acryloyloxyisopropyl)benzene and 1,2-bis(2-meth)acryloyloxyisopropyl)benzene; divinylbenzene; diallyl phthalate; diallyl adipate; and triallyl isocyanurate. Such a crosslinking agent is used preferably in an amount of from 0.01 to 10% by weight, based on the total weight of copolymerizable components. If the amount of such a crosslinking agent is less than the lower limit, no adequate effects for improving the mechanical strength and durability will be obtained by using such a crosslinking agent. On the other hand, if it exceeds the above upper limit, the resulting ocular lens material tends to be brittle.

Further, in order to impart ultraviolet absorptivity or a color to the resulting ocular lens material, a polymerizable ultraviolet absorber, a polymerizable dyestuff or a polymerizable ultraviolet absorbing dyestuff may, for example, be used as other monomer (C).

Specific examples of the polymerizable ultraviolet absorber include benzophenone type polymerizable ultraviolet absorbers such as 2-hydroxy-4(meth)acryloyloxybenzophenone, 2-hydroxy-4-(meth)acryloyloxy- 5-tert-butylbenzophenone, 2-hydroxy-4-(meth)acryloyloxy- 2',4'-dichlorobenzophenone and 2-hydroxy- 4-(2'-hydroxy-3'(meth)acryloyloxypropoxy)benzophenone; benzotriazole type polymerizable ultraviolet absorbers such as 2-(2'-hydroxy- 5'-(meth)acryloyloxyethylphenyl)-2H-benzotriazole, 2-(2'-hydroxy-5-(meth)acryloyloxyethylphenyl)- 5-chloro-2H-benzotriazole, 2-(2'-hydroxy-5'-(meth)acryloyloxypropylphenyl)-2H-benzotriazole and 2-(2'-hydroxy-5'-(meth)acryloyloxypropyl- 3'-tert-butylphenyl)-5-chloro-2H-benzotriazole; salicylic acid derivative-type polymerizable ultraviolet absorbers such as phenyl 2-hydroxy- 4-(meth)acryloyloxymethylbenzoate; and other polymerizable ultraviolet absorbers such as methyl 2-cyano- 3-phenyl-3-(3'-(meth)acryloyloxyphenyl)propenoate. These polymerizable ultraviolet absorbers may be used alone or in combination as a mixture of two or more of them.

Specific examples of the polymerizable dyestuff include azo type polymerizable dyestuffs such as 1-phenylazo-4-(meth)acryloyloxynaphthalene, 1-phenylazo-2-hydroxy-3-(meth)acryloyloxynaphthalene, 1-naphthylazo-2-hydroxy- 3-(meth)acryloyloxynaphthalene, 1-(α-anthrylazo)-2-hydroxy-3-(meth)acryloyloxynaphthalene, 1-((4'-(phenylazo)phenyl)azo)-2-hydroxy-3(meth)acryloyloxynaphthalene, 1-(2',4'-xylylazo)-2-(meth)acryloyloxynaphthalene, 1-(o-tolylazo)-2(meth)acryloyloxynaphthalene, 2-(m-(meth)acryloylamide-anilino)- 4,6-bis(1'-(o-tolylazo)-2'-naphthylamino)-1,3,5-triazine, 2-(m-vinylanilino)-4-((4'-nitrophenylazo)-anilino)- 6-chloro-1,3,5-triazine, 2-(1'-(o-tolylazo)-2'-naphthyloxy- 4-(m-vinylanilino)-6-chloro-1,3, 5-triazine, 2-(p-vinylanilino)-4-(1'-(o-tolylazo)-2'-naphthylamino)6-chloro-1,3,5-triazine, N-(1'-(o-tolylazo)-2'-naphthyl)3-vinylphthalic acid monoamide, N-(1'-(o-tolylazo)-2'- naphthyl)-6-vinylphthalic acid monoamide, 3-vinylphthalic acid-(4'-(p-sulfophenylazo)-1'-naphthyl) monoester, 6vinylphthalic acid-(4'-(p-sulfophenylazo)-1'naphthyl)monoester, 3-(meth)acryloylamide-4phenylazophenol, 3-(meth)acryloylamide-4-(8'-hydroxy3', 6'-disulfo-1'-naphthylazo)phenol, 3-(meth)acryloylamide- 4-(1'-phenylazo-2'naphthylazo)phenol, 3-(meth)acryloylamide-4-(p-tolylazo)phenol, 2-amino-4-(m-(2'-hydroxy-1'-naphthylazo)anilino)- 6-isopropenyl-1, 3,5-triazine, 2-amino- 4-(N-methyl-p-(2'-hydroxy-1'-naphthylazo)anilino)6-isopropenyl-1, 3,5-triazine, 2-amino-4-(m-(4'-hydroxy-1'-phenylazo)anilino)-6-isopropenyl-1,3,5-triazine, 2-amino- 4-(N-methyl-p-(4'-hydroxyphenylazo)anilino)-6-isopropenyl- 1,3,5-triazine, 2-amino-4-(m-(3'-methyl-1'-phenyl- 5'-hydroxy-4'-pyrazolylazo)anilino)-6-isopropenyl-1,3,5-triazine, 2-amino-4-(N-methyl-p-(3'-methyl-1'-phenyl- 5'-hydroxy-4'-pyrazolylazo)anilino)-6-isopropenyl-1,3,5-triazine, 2-amino-4-(p-phenylazoanilino)-6-isopropenyl- 1,3,5-triazine and 4-phenylazo-7-(meth)acryloylamide- 1-naphthol; anthraquinone type polymerizable dyestuffs such as 1,5-bis((meth)acryloylamino)- 9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)- 9,10-anthraquinone, 4-hydroxy-1-(4'-vinylbenzoylamide)- 9,10-anthraquinone, 1-(3'-vinylbenzoylamide)- 9,10-anthraquinone, 1-(2'-vinylbenzoylamide)- 9,10-anthraquinone, 1-(4'-isopropenylbenzoylamide)- 9,10-anthraquinone, 1-(3'-isopropenylbenzoylamide)- 9,10-anthraquinone, 1-(2'-isopropenylbenzoylamide)- 9,10-anthraquinone, 1,4-bis-(4'-vinylbenzoylamide)- 9,10-anthraquinone, 1,4-bis-(4'-isopropenylbenzoylamide)- 9,10-anthraquinone, 1,5-bis-(4'-vinylbenzoylamide)- 9,10-anthraquinone, 1,5-bis-(4'-isopropenylbenzoylamide)- 9,10-anthraquinone, 1-methylamino-4-(3'-vinylbenzoylamide)- 9,10-anthraquinone, 1-methylamino-4-(4'-vinylbenzoyloxyethylamino)-9,10-anthraquinone, 1-amino-4-(3'-vinylphenylamino)- 9,10-anthraquinone-2-sulfonic acid, 1-amino-4-(4'-vinylphenylamino)- 9,10-anthraquinone-2-sulfonic acid, 1-amino-4-(2'-vinylbenzylamino)- 9,10-anthraquinone-2-sulfonic acid, 1-amino-4-(3'-(meth)acryloylaminophenylamino)- 9,10-anthraquinone-2-sulfonic acid, 1-amino-4-(3'-(meth)acryloylaminobenzylamino)- 9,10-anthraquinone-2sulfonic acid, 1-(β-ethoxycarbonylallylamino)-9,10anthraquinone, 1-(β-carboxyallylamino)-9,10anthraquinone,1,5-di-(β-carboxyallylamino)-9,10anthraquinone, 1-(β-isopropoxycarbonylallylamino)-5-benzoylamide-9,10-anthraquinone, 2-( 3'-(meth)acryloylamide-anilino)- 4-(3'-(3"-sulfo-4"-aminoanthraquinon-1"-yl)amino-anilino)-6-chloro-1,3,5triazine, 2-(3'-(meth)acryloylamide-anilino)-4-(3'-(3"-sulfo-4"-aminoanthraquinon-1'-yl)amino-anilino)-6-hydrazino- 1,3,5-triazine, 2,4-bis-((4"-methoxyanthraquinon- 1"-yl)amino)-6-(3'-vinylanilino)1,3,5-triazine and 2-(2'-vinylphenoxy)-4-(4'-(3"-sulfo-4"-aminoanthraquinon-1"-yl-amino)anilino)-6-chloro-1,3,5triazine; nitro type polymerizable dyestuffs such as o-nitroanilinomethyl (meth)acrylate; and phthalocyanine type polymerizable dyestuffs such as (meth)acryloyl-modified tetramino copper phthalocyanine and (meth)acryloyl-modified (dodecanoyl-modified tetraamino copper phthalocyanine). These polymerizable dyestuffs may be used alone or in combination as a mixture of two or more of them.

Specific examples of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy- 5-(p-styrenoazo)benzophenone, 2,4-dihydroxy- 3-(p-(meth)acryloyloxymethylphenylazo)benzophenone, 2,4-dihydroxy- 5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di(meth)acryloyloxyethylamino)phenylazo)benzophenone, 2,4-dihydroxy-5-(o-(N,N-di(meth)acryloylethylamino)phenylazo)benzophenone, 2,4-dihydroxy-3-(p-(N-ethyl-N(meth)acryloyloxyethylamino)phenylazo)benzophenone, 2,4-dihydroxy-5-(p-(N-ethyl-N(meth)acryloyloxyethylamino)phenylazo)benzophenone, 2,4-dihydroxy-3-(o-(N-ethyl-N(meth)acryloyloxyethylamino)phenylazo)benzophenone, 2,4-dihydroxy-5-(o-(N-ethyl-N(meth)acryloyloxyethylamino)phenylazo)benzophenone, 2,4-dihydroxy-3-(p-(N-ethyl-N(meth)acryloylamino)phenylazo)benzophenone, 2,4-dihydroxy-5-(p-(N-ethyl-N(meth)acryloylamino)phenylazo)benzophenone, 2,4-dihydroxy-3-( o-(N-ethyl-N(meth)acryloylamino)phenylazo)benzophenone and 2,4-dihydroxy-5-( o-(N-ethyl-N(meth)acryloylamino)phenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more of them.

The copolymerizable components comprising the di(meth)acrylate (A), the di(meth)acrylate (B) and other monomer (C) are suitably adjusted and subjected to copolymerization depending upon the particular purpose of the desired ocular lens such as a contact lens or an intraocular lens.

In the present invention, the copolymerizable components comprising the di(meth)acrylate (A), the di(meth)acrylate (B) and other monomer (C) are adjusted to have desired proportions within the above-mentioned ranges, and a radical polymerization initiator is added thereto, followed by polymerization by a usual method, to obtain a copolymer.

The usual method may be a method of gradually heating the mixture after the addition of the radical polymerization initiator, at a temperature within a range of from room temperature to about 120° C., or a method of irradiating electromagnetic waves such as microwaves, ultraviolet rays or radiation rays (γ-rays). In the case of the heat polymerization, the temperature may stepwise be raised. The polymerization may be conducted by a bulk polymerization method or a solution polymerization method using e.g. a solvent, or it may be conducted by any other method.

Specific examples of the radical polymerization initiator include azobisisobutyronitrile, azobisdimethylvaleronitrile, benzoyl peroxide, tert-butyl hydroperoxide and cumene hydroperoxide. These radical polymerization initiators may be used alone or in combination as a mixture of two or more of them. In a case where photopolymerization is employed, a photopolymerization initiator or sensitizer is preferably added. The above-mentioned polymerization initiator or sensitizer is incorporated usually in an amount of from about 0.001 to 2 parts by weight, preferably from 0.01 to 1 part by weight, per 100 parts by weight of the total amount of copolymerizable components.

In the present invention, for the shaping of ocular lenses such as contact lenses or intraocular lenses, shaping methods commonly used by those skilled in the art may be employed. As such shaping methods, there may be mentioned, for example, a lathe cutting and grinding method and a molding method. The cutting and grinding method is a method in which the polymerization is conducted in a suitable mold or vessel to obtain a rod-, block- or plate-shaped base material (copolymer), and then the base material is processed into a desired shape by mechanical processing such as cutting, grinding and polishing. The molding method is a method wherein a mold corresponding to the shape of a desired ocular lens is prepared, and the polymerization of the above-mentioned lens components is conducted in this mold to obtain a molded product, which may further be subjected to mechanical finishing treatment, if necessary.

When it is desired to obtain the ocular lens material of the present invention as a material which is soft at a temperature around room temperature, it is usually preferred to employ a molding method for molding an ocular lens. As such a molding method, a usual spin casting method or a static casting method may, for example, be mentioned.

Apart from these methods, it is possible to employ a method for the present invention in which a monomer capable of forming a hard polymer is impregnated in a soft lens material, and then such a monomer is polymerized to harden the entirety, which is then subjected to cutting and grinding processing, and from a product processed to a desired shape, the hard polymer is removed to obtain a shaped product composed of the soft lens material (Japanese Unexamined patent publications No. 278024/1987 and No. 11854/1989).

Further, when an intraocular lens is to be obtained, a supporting portion of the lens may be prepared separately from the lens and then attached to the lens, or it may be molded simultaneously (integrally) with the lens.

Now, the ocular lens material of the present invention will be described in detail with reference to Examples. However, it should be understood that the present invention is by no means restricted to such specific Examples.

EXAMPLE 1

10 parts by weight of a diacrylate of the formula:

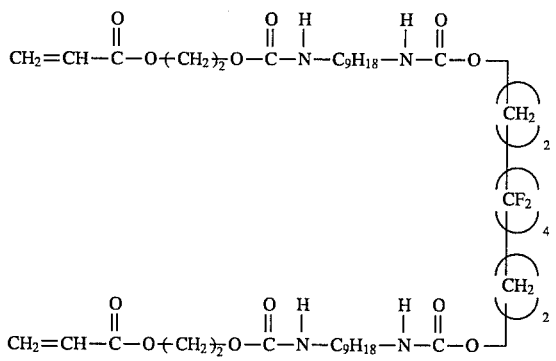

(di(meth)acrylate (A), hereinafter referred to as macromonomer A-1), 40 parts by weight of a diacrylate of the formula:

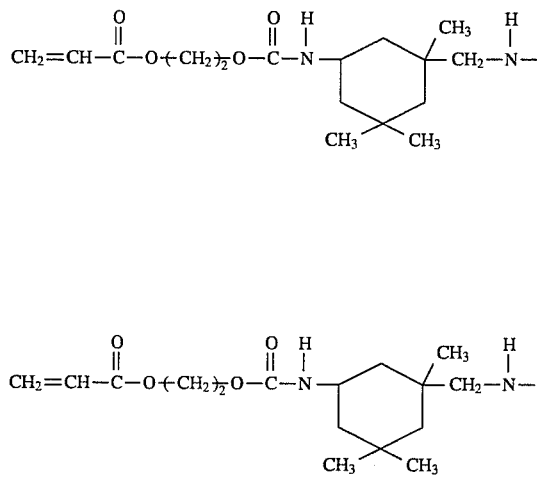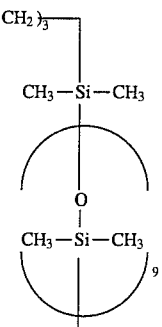

(di(meth)acrylate (B), hereinafter referred to as macromonomer B), 50 parts by weight of N,N-dimethylacrylamide (hereinafter referred to as DMAA), 0.3 part by weight of ethylene glycol dimethacrylate (hereinafter referred to as EDMA) as a crosslinking agent, and 0.1 part by weight of 2,2'-azobis(2,4-dimethylvaleronitrile) (hereinafter referred to as V-65) as a polymerization initiator, were uniformly mixed to obtain a transparent solution. This solution was put into a glass test tube and sealed with a stopper. Then, the test tube was transferred into a constant-temperature bath and subjected to preliminary polymerization at 35° C. for 40 hours and at 50° C. for 8 hours. Then, the test tube was transferred into an air circulating dryer, and the temperature was raised from 60° C. to 110° C. at a rate of 10° C. per two hours. Further, polymerization was conducted at 120° C. for one hour, and strain removal was carried out at 110° C. for two hours to obtain a copolymer.

Then, the obtained copolymer was cut and subjected to grinding and polishing treatment, then immersed in a physiological saline for at least 8 hours, followed by boiling for at least 16 hours, to obtain test specimens, and various physical properties were measured in accordance with the following methods. The results are shown in Table 1.

(a) penetration strength

By means of an Instron type compression tester, a pressing needle having a diameter of 1/16 inch was pressed against the center of a test specimen, and the load (g) at the time of the breakage of the test specimen was measured. However, the values listed in Table 1 are values calculated as the thickness of the test specimen was 0.2 mm.

(b) Elongation

The elongation (%) at the time of the breakage of the test specimen in the above-mentioned measurement of the penetration strength (g), was measured.

(c) Oxygen permeability coefficient

The oxygen permeability coefficient ($DK_{O_2}$) of a test specimen was measured in a physiological saline at 35° C. by means of Seikaken type film oxygen permeability measuring instrument manufactured by Rika Seiki Kogyo Kabushiki Kaisha. The unit for oxygen permeability coefficient is ($cm^2$/sec).(ml.mmHg)). The values in the Table 1 are numerical values obtained by multiplying the measured values by $10^{11}$.

(d) Water content

With respect to a test specimen (thickness at the time of cutting: 1 mm), the water content (wt %) of the test specimen was determined in accordance with the following equation:

Water content (wt %)={$(W-W_0)/W$}×100 where W is the weight (g) of the test specimen upon absorption of water to the equilibrium state, and Wo is weight (g) of the test specimen in the dried state.

(e) Refractive index

The refractive index ($n_D^{25}$) of a test specimen having a thickness of 0.2 mm was measured by means of an Abbe refractometer (tradename 1-T, manufactured by Kabushiki Kaisha Atago) at 25° C. under a relative humidity of 50%.

(f) Deposit resistance

A test specimen and a poly(methyl)methacrylate (PMMA) plate as a control were immersed for 24 hours in an artificial tear prepared in accordance with the FDA guide-line (CLASS III, 1985) (a buffer solution of pH7.3, lysozyme: 1.2 mg/ml, albumin: 3.88 mg/ml, immunoglobulin: 1.61 mg/ml, sodium chloride: 9 mg/ml, calcium ion: 0.04 mg/ml) and then washed with running water, whereupon the surfaces of the test specimen and the PMMA plate were observed by means of a stereoscopic microscope (20 magnifications), and deposition resistance was evaluated in accordance with the following evaluation standards.

Evaluation standards o: There is no difference as compared with the PMMA plate, and no stain (deposition) is observed on the surface of the test specimen.

Δ: There is a slight difference as compared with the PMMA plate, and a stain is observed on the surface of the test specimen.

×: There is a distinct difference as compared with the PMMA plate, and a substantial stain is observed on the surface of the test specimen.

EXAMPLES 2 TO 9 AND COMPARATIVE EXAMPLES 1 TO 3

Polymerization was conducted in the same manner as in Example 1 except that the composition was changed as shown in Table 1, and test specimens were prepared from the obtained copolymer.

Using the test specimens, various physical properties were measured in the same manner as in Example 1. The results are shown in Table 1.

In Table 1, macromonomer A-2 represents a diacrylate (the di(meth)acrylate (A)) of the formula:

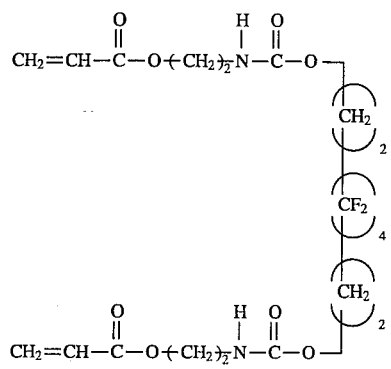

TABLE 1

| Nos. | Composition (parts by weight) | | | | | Physical properties | | | | | |
|---|---|---|---|---|---|---|---|---|---|---|---|
| | Macro-monomer A | Macro-monomer B | DMAA | EDMA | V-65 | Penetration strength (g) | Elongation (%) | Oxygen permeability coefficient | Water content (wt %) | Refractive index (—) | Deposit resistance |
| Example 1 | A-1 (10) | 40 | 50 | 0.3 | 0.1 | 161 | 11 | 20 | 35 | 1.44 | o |
| Example 2 | A-1 (20) | 30 | 50 | 0.3 | 0.1 | 192 | 15 | 18 | 34 | 1.44 | o |
| Example 3 | A-1 (10) | 30 | 60 | 0.3 | 0.1 | 117 | 12 | 24 | 46 | 1.43 | o |
| Example 4 | A-1 (20) | 20 | 60 | 0.3 | 0.1 | 144 | 14 | 21 | 44 | 1.43 | o |
| Example 5 | A-1 (10) | 20 | 70 | 0.3 | 0.1 | 90 | 16 | 28 | 56 | 1.41 | o |
| Example 6 | A-1 (20) | 10 | 70 | 0.3 | 0.1 | 142 | 26 | 28 | 56 | 1.41 | o |
| Example 7 | A-2 (10) | 40 | 50 | 0.3 | 0.1 | 181 | 15 | 23 | 34 | 1.44 | o |
| Example 8 | A-2 (20) | 30 | 50 | 0.3 | 0.1 | 158 | 10 | 16 | 32 | 1.45 | o |
| Example 9 | A-2 (10) | 30 | 60 | 0.3 | 0.1 | 99 | 10 | 23 | 43 | 1.43 | o |
| Comparative Example 1 | A-2 (30) | — | 70 | 0.3 | 0.1 | 40 | 5 | 12 | 47 | 1.38 | Δ |
| Comparative Example 2 | A-2 (40) | — | 60 | 0.3 | 0.1 | 50 | 7 | 10 | 42 | 1.4 | Δ |
| Comparative Example 3 | A-2 (50) | — | 50 | 0.3 | 0.1 | 60 | 9 | 8 | 33 | 1.42 | Δ |

It is evident from the results shown in Table 1 that the ocular lens materials obtained in Comparative Examples 1 to 3 wherein the di(meth)acrylate (B) was not employed, have small oxygen permeability coefficients which largely depend on the water content, whereas the ocular lens materials obtained in Examples 1 to 9 have large oxygen permeability coefficients which do not so much depend on the water content, and further they have large refractive indices and mechanical strength and are excellent also in the deposit resistance.

As described in the foregoing, the ocular lens material of the present invention has high oxygen permeability and high mechanical strength and at the same time is excellent also in the deposit resistance, and thus it is suitable for use as contact lenses, intraocular lenses or artificial cornea.

What is claimed is:

1. An ocular lens material made of a copolymer obtained by polymerizing copolymerizable components comprising from 10 to 20 wt % of (A) a fluorine-containing di(meth) acrylate having urethane bonds, of formula (I):

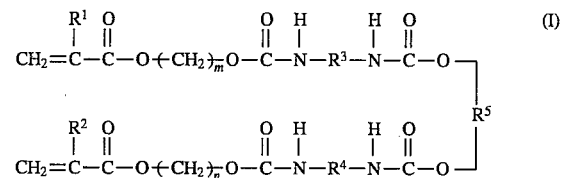

wherein each of $R^1$ and $R^2$ independently represents a hydrogen atom or a methyl group, each of $R^3$ and $R^4$ independently represents a $C_{5-15}$ alkylene group, $R^5$ represents a $C_{1-20}$ alkylene group containing from 1 to 20 fluorine atoms, and each of m and n independently represents an integer of from 1 to 5, and from 10 to 40 wt % of (B) a silicone-containing di(meth)acrylate having urethane bonds, of the formula (II):

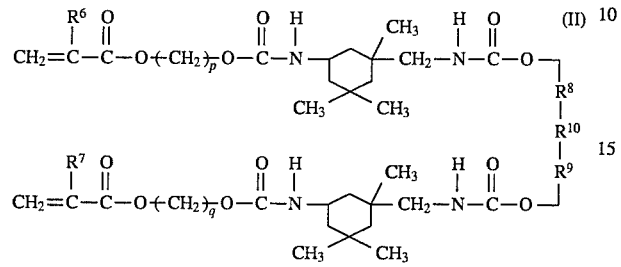

wherein each of $R^6$ and $R^7$ independently represents a hydrogen atom or a methyl group, each of $R^8$ and $R^9$ independently represents a $C_{1-10}$ alkylene group or a $C_{2-10}$ ether group, $R^{10}$ represents a siloxane structure of the formula (III):

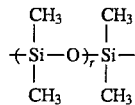

wherein r is an integer of from 1 to 50, and each of p and q independently represents an integer of from 1 to 5, and from 40 to 80 wt % of (C) at least one monomer having an unsaturated double bond, copolymerizable with the fluorine-containing di(meth)acrylate (A) and the silicone-containing di(meth)acrylate (B), the monomer (C) containing at least one member selected from the group consisting of (meth)acrylamides and N-vinyl lactams.

2. The ocular lens material according to claim 1, wherein in the formula (I), each of $R^3$ and $R^4$ independently represents a $C_{5-10}$ alkylene group, and $R^5$ is a $C_{4-10}$ alkylene group containing from 4 to 10 fluorine atoms.

3. The ocular lens material according to claim 1, wherein in the formula (II), each of $R^8$ and $R^9$ independently represents a $C_{2-6}$ alkylene group or a $C_{2-6}$ ether group, and $R^{10}$ is the siloxane structure of the formula (III) wherein r is an integer of from 1 to 30.

* * * * *